United States Patent [19]
Schimek

[11] 3,787,946
[45] Jan. 29, 1974

[54] PLUG REMOVER
[75] Inventor: Robert Schimek, Milwaukee, Wis.
[73] Assignee: Globe-Union Inc., Milwaukee, Wis.
[22] Filed: June 28, 1972
[21] Appl. No.: 267,129

[52] U.S. Cl. ............... 29/200 D, 29/204, 29/282
[51] Int. Cl. B23p 19/00, H01m 35/18, B23p 19/04
[58] Field of Search.. 29/200 D, 204 R, 204 D, 282, 29/265, 204

[56] References Cited
UNITED STATES PATENTS
2,696,039  12/1954  Baker ............................ 29/200 D
3,208,134  9/1965  Krewson, Jr. .................. 29/282 X
3,686,735  8/1972  Hill .............................. 29/205 R Primary Examiner—Thomas H. Eager
Attorney, Agent, or Firm—Neil E. Hamilton; John Phillip Ryan

[57] ABSTRACT

A device for removing resilient, cuplike sealing caps from sealing engagement with openings. A plurality of projections extend from a gripping member and are constructed to engage a multiplicity of the caps at one time, the ends of the projections engaging an inner wall surface of the cap near its bottom and being pivoted by means of an upper opposing wall surface to exert an upward force on the cap to remove it from sealing engagement. The plug remover is particularly adaptable for use in removing sealing plugs from the covers of lead acid storage batteries.

7 Claims, 3 Drawing Figures

PATENTED JAN 29 1974 3,787,946

PLUG REMOVER

BACKGROUND OF THE INVENTION

This invention relates to a device for removing sealing caps from openings and, more particularly, to removing cuplike or open hollow sealing caps from sealing engagement with the vent portion of a lead acid storage battery.

Vent caps of the type which the device of this invention is intended to remove are described in U.S. Pat. No. 3,148,798. These caps are cuplike in configuration having a hollow center and are resilient so as to frictionally engage the walls of a substantially circular opening. They are particularly adaptable for use as sealing plugs and employed during storage of lead acid storage batteries which are stored with a minimum amount of forming acid or in a dry state so as to prevent air or other matter from entering the battery cells. As the vent caps must be removed at some time prior to use of the battery so as to add acid electrolyte they serve only as a temporary sealing means. Consequently, it becomes expedient to have a device which can remove a multiplicity of the caps at one time. After storage, such as at a large factory or distribution center, this removal must be done in a quick and efficient manner and as a minimum of six vent caps are normally provided on each battery cover, it is necessary that as many as possible be removed in one motion.

It is an object of the present invention to provide a device for removing sealing caps from the sealing engagement with an opening in a quick and efficient manner. It is another object of this invention to provide a cap removing device which can remove a plurality of caps at one time and is manually operable. It is still another object of the present invention to provide a device for removing cuplike sealing caps which is fabricated at a minimum of cost and with a minimum number of parts. It is yet another object of this invention to provide a cap removing device which is specially suitable for removing vent sealing caps from a lead acid storage battery.

SUMMARY OF THE INVENTION

The foregoing objects are accomplished and the shortconings of the prior art are overcome by the present sealing cap remover which is comprised of a plurality of projections extending from a gripping member with the projections being disposed in substantially a coplanar relationship and extending substantially equidistant from the gripping member. Cap engaging ends are provided on the projections at the ends thereof and away from the gripping member to fit within the confines of the caps and to engage an inner wall surface of the cap as well as an upper opposing wall surface. Leverage can then be exerted on the upper wall surface to exert an opposing upward lifting or rocking force on the opposing inner wall.

BRIEF DESCRIPTION OF DRAWINGS

A better understanding of the present plug removing device will be accomplished by reference to the drawing wherein.

DESCRIPTION OF THE PREFERRED EMBODIMENT

Figure 1:
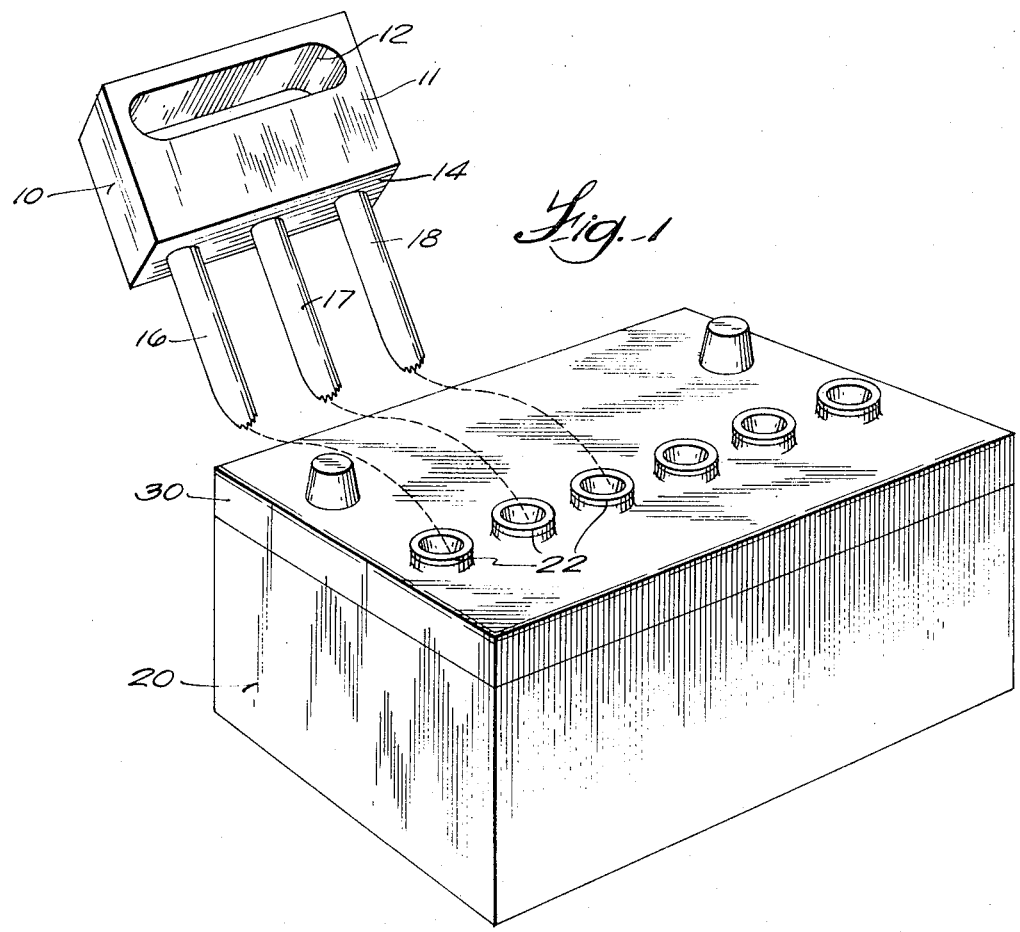
FIG. 1 is a perspective view of the cap removing device shown in a spaced position prior to engagement with the vent caps of a standard storage battery with an indicated path of travel.

Proceeding to a detailed description of the present invention, the sealing cap removal device generally 10 is comprised of a gripping member 11 which is of a general blocklike configuration having an opening 12 which will accommodate the fingers of the average human hand. Extending from a side wall 14 of the gripping member 11 and disposed in substantially coplanar relationship are three projections 16, 17 and 18 each extending substantially the same distance from wall 14. A standard lead acid storage battery generally 20 has six cuplike resilient sealing caps 22 which close the usual vent ports of a sixcelled storage battery. The caps are of the resilient type and are shown in U.S. Pat. No. 3,148,798.

Figures 2, 3:
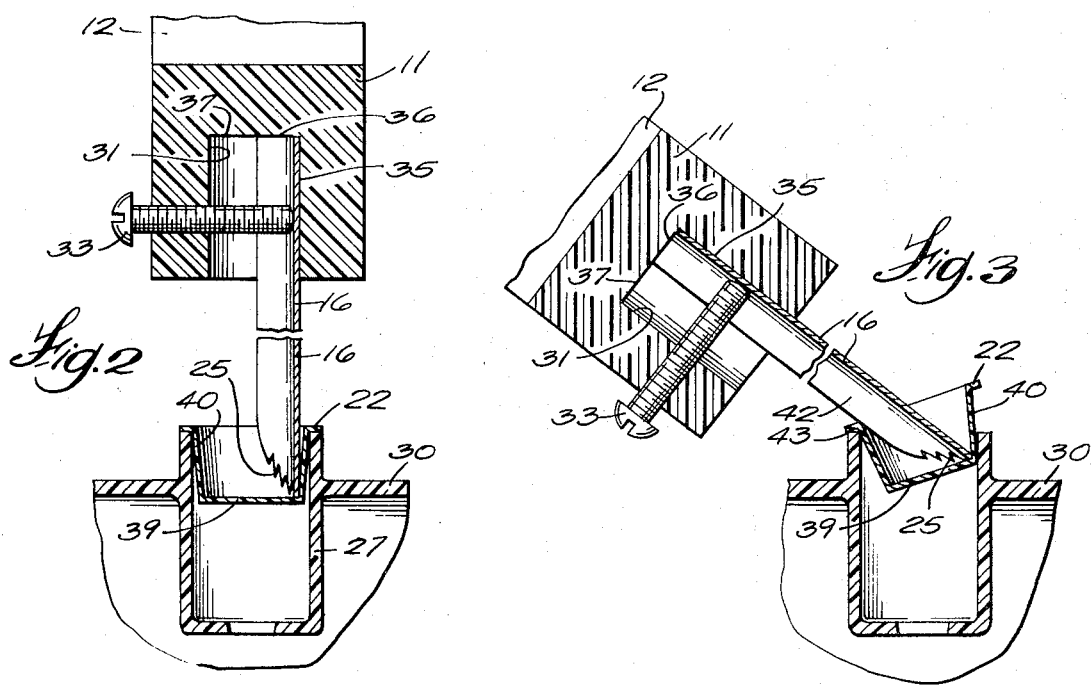
FIG. 2 is a partial view in vertical section showing the vent cap removing device of this invention engaging initially a vent cap.
FIG. 3 is a view similar to FIG. 2 except showing the vent cap removing device imparting an upward movement and removal of the vent sealing cap.

As will be noted in the drawing, projections 16, 17 and 18 are of a general concave configuration and, as will be noted particularly in FIGS. 2 and 3, have serrated ends or tips 25. These provide for frictional engagement with the internal wall surface 40 of cap 22 to remove it from the annular vent port 27 in battery cover 30. The projections are of a width so as to fit within the confines of the plugs 22 and are held in block 11 by three circular openings such as the one shown at 31. A screw 33 extends transversely through block 11 and is threadably carried therein. It engages the projections such as 16 at the center of the lowermost portion of the concave section to hold projection 16 against an opposing rounded wall section 35 for added stability. The end wall portion 36 of projection 16 will abut against wall section 37 of opening 31 for the same purpose. The same retention features apply for projections 17 and 18.

OPERATION

A better understanding of the advantages of the sealing cap removal device 10 will be had by a description of its operation. The projections 16, 17 and 18 will be orientated substantially axially over the caps 22 and then moved downwardly to place them against bottom wall 39 and adjacent a side wall 40 inside caps 22 as shown in FIG. 2. A slight downward force will then be exerted so that serrations 25 grip the lower wall 39 adjacent a side wall 40 of the cap. The gripping device will then be moved toward the opposite side of the resilient vent cap to exert a rocking motion with the shank portion 42 of projection 16 pivoting against the opposite and upper wall surface 43 of cap 22. The cap will then be flexed and moved upwardly as shown in FIG. 3 with subsequent removal from vent port 27 in cover 30.

In the foregoing description of the sealing cap removal device 10 three projections 16, 17 and 18 are indicated as extending from the gripping member 11. If desired, the gripping member 11 could be enlarged and the number of projections added to be as many as six so as to accommodate all six sealing caps 22 on the cover 30 on a lead acid storage battery 20. The projections 16, 17 and 18 are shown to be of a concave configuration for the reason that some of the plugs which are employed may be of the exact type described in U.S. Pat No. 3,148,798 and have a center handle tab which is spaced from the inner circular wall of the cap. The concave configuration permits placement of the projections around the tab but if desired, the projections and tips 25 could be made flat or of various geometric configurations. Further, in the preferred embodiment the projections 16, 17 and 18 are held within the gripping member 11 by threaded screw 33 and opening 31. Other means could be employed to secure the gripping members in block 11 such as molding or use of frictional engagement. Further, instead of employing three separate circular openings 31 for each projection, one elongated slot could be molded in gripping member 11.

Serrations 25 are indicated on the ends of the projections and if positive engagement is required they should be employed. Otherwise, they could be eliminated as can the opening 12 which accommodates the fingers of a hand.

The preferred material for fabricating projections 16, 17 and 18 is steel. However, other rigid or semi-rigid materials such as nonferrous metals and rigid plastics which can be serrated could be substituted. Gripping member 11 is molded from an acrylic plastic material. However, other rigid resinous products such as nylon, polycarbonates, polystyrenes could be substituted as well as light weight metals such as aluminum.

It will thus be seen that through the present invention there is now provided a plug removing device which is easy to manipulate yet positive in its operation. The plug removing device is very economical to manufacture yet durable in its fabrication. Any number of resilient vent caps can be removed by the device of this invention by merely providing the desired number of projections. Various geometric configurations can be afforded for the projections to fit various types of sealing vent caps.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A device for removing a hollow cuplike sealing cap from sealing engagement with a vent opening comprising a gripping member, a plurality of projections having shank portions extending from said member, said projections being disposed in substantially a coplanar relationship and extending substantially equidistant from said gripping member, cap engaging ends carried by said projections at the ends thereof away from said gripping member, said engaging ends constructed and arranged to be accommodated by and fit within the confines of said caps so as to engage an inner wall surface of the cap at their engaging ends over more than a single point and an opposing upward wall surface with their shank portions, so that an upward pivoting effect can be accomplished by means of a downward movement of the gripping member to remove said cap.

2. The device as defined in claim 1 wherein the engaging ends are provided with serrations disposed at the tips of the projections.

3. The device as defined in claim 2 wherein the projections and the engaging ends are of a concave configuration.

4. The device as defined in claim 1 wherein the gripping member has an opening adapted to receive a human hand.

5. The device as defined in claim 1 wherein the projections are disposed on the gripping member and are equally spaced from each other.

6. The device as defined in claim 1 wherein the projections are secured in the gripping member by an opening having a wall surface and further including a screw threaded fastening means biasing said projections against the wall of said opening.

7. The device as defined in claim 1 wherein said vent openings compose a portion of a storage battery cover.

* * * * *